(12) United States Patent
Beeson et al.

(10) Patent No.: US 6,305,811 B1
(45) Date of Patent: Oct. 23, 2001

(54) ILLUMINATION SYSTEM HAVING AN ARRAY OF LINEAR PRISMS

(75) Inventors: Karl W. Beeson, Princeton; Han Zou, Windsor, both of NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/160,941

(22) Filed: Sep. 25, 1998

(51) Int. Cl.[7] .................................................. F21V 8/00
(52) U.S. Cl. .............................. 362/31; 362/26; 362/330; 362/331; 362/19; 362/268; 349/65; 385/146
(58) Field of Search ................................ 362/31, 26, 330, 362/331, 19, 268; 349/65; 385/146

(56) References Cited

U.S. PATENT DOCUMENTS

| | | | |
|---|---|---|---|
| 5,359,691 | 10/1994 | Tai et al. ................................. | 385/146 |
| 5,390,276 | 2/1995 | Tai et al. ................................. | 385/146 |
| 5,428,468 | * 6/1995 | Zimmerman et al. .................. | 359/40 |
| 5,845,035 | * 12/1998 | Wimberger-Friedl ................. | 385/129 |
| 5,887,964 | * 3/1999 | Higushi et al. ......................... | 362/31 |
| 6,036,340 | * 3/2000 | Fohl et al. ............................... | 362/511 |
| 6,106,128 | * 8/2000 | Zou et al. ................................ | 362/31 |
| 6,172,809 | * 1/2001 | Koike et al. ............................ | 359/487 |
| 6,185,357 | * 2/2001 | Zou et al. ............................... | 385/133 |
| 6,243,150 | * 6/2001 | Watanabe et al. ...................... | 349/65 |

\* cited by examiner

*Primary Examiner*—Stephen Husar
*Assistant Examiner*—Anabel Ton
(74) *Attorney, Agent, or Firm*—John G. Shudy, Jr.

(57) ABSTRACT

An illumination system provides a light output distribution that is ideally suited for home and office applications. The illumination system generally comprises a solid waveguide and a light directing structure located on a side opposite of the waveguide's light output side for controlling the light output distribution from the illumination system. The light directing structure may be unitarily formed with the waveguide or it may be secured thereto by an interface which provides approximately 100% contact between the waveguide and light directing structure. The light directing structure includes an array of light directing features configured as generally lenticular prisms that extend in a direction substantially perpendicular (i.e., not parallel) to the average direction at which light rays enter and propagate through the waveguide. Each light directing feature defines an included angle that controls the distribution of light output from the illumination system in a first direction. The interface, when provided, controls the distribution of light output from the illumination system in a second direction that is generally orthogonal with respect to the first direction.

21 Claims, 5 Drawing Sheets

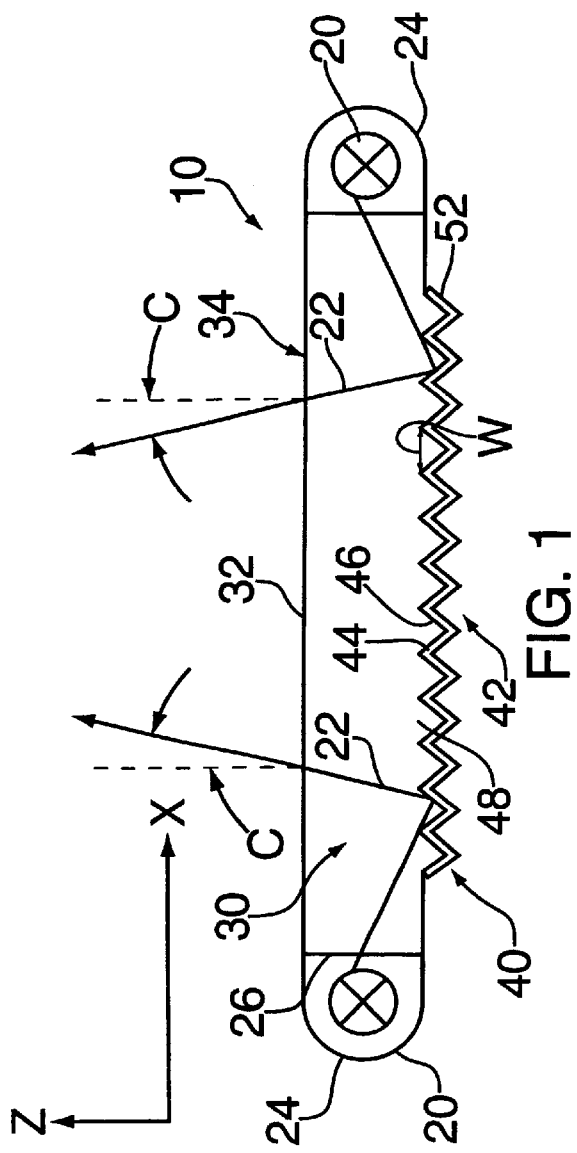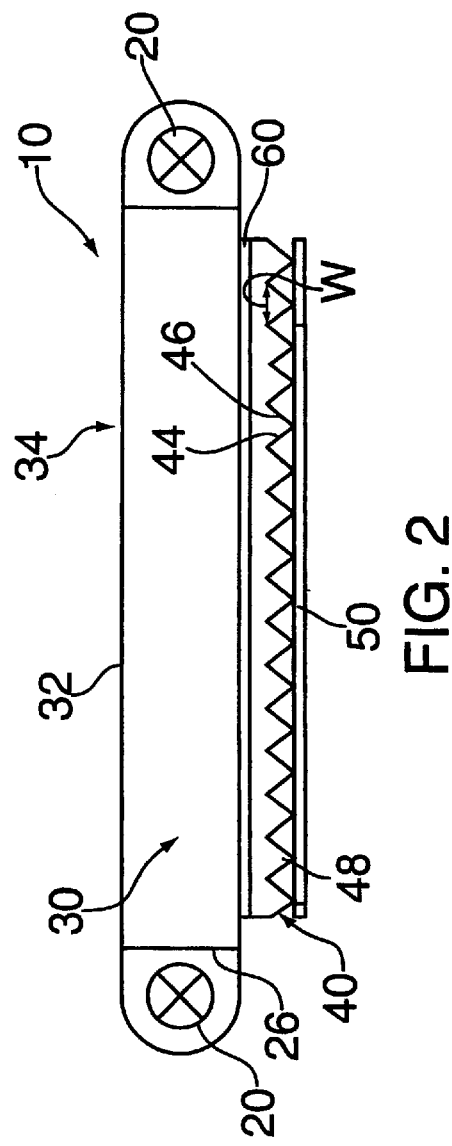
FIG. 1
FIG. 2

ILLUMINATION SYSTEM HAVING AN ARRAY OF LINEAR PRISMS

BACKGROUND OF THE INVENTION

1. Field of the Invention

This invention relates to illumination systems, and more particularly, to an illumination system having an array of linear prisms located on a side of a solid waveguide opposite to which light emerges from the waveguide for controlling the light output distribution of the illumination system.

2. Description of the Prior Art

For home and office applications, it is desirable to control the angular light output distribution of illumination systems to prevent flooding areas with high angle light and to also eliminate light hot-spots (i.e., concentrations of light) when looking at the illumination system. Control of the angular output distribution has been accomplished by pre-limiting or pre-collimating the light input to the illumination system (see, e.g. U.S. Pat. Nos. 5,359,691 and 5,390,276 to Tai et al.). Such illumination systems require additional devices and structures to ensure the collimation of input light. In addition, the illumination systems disclosed in these patents are directed to backlighting of liquid crystal displays (LCDs), which require a highly collimated light output. e.g., output angles no greater than ±20°, where output angles are measured from a direction perpendicular to the plane of the output surface of the waveguide.

It is thus desirable to provide an illumination system that can accept an unrestricted light input (i.e. un-collimated or full hemisphere) and that can control the light output distribution and intensity. Such illumination systems must be inexpensive to manufactures durable and reliable.

SUMMARY OF THE INVENTION

The present invention provides an illumination system that advantageously provides a light output distribution that is ideally suited for home and office applications. The illumination system generally comprises a solid waveguide and a light directing structure located on a side opposite of the waveguide's light output side for controlling the light output distribution from the illumination system. The light directing structure may be unitarily formed with the waveguide or it may be secured thereto by an interface which provides approximately 100% contact between the waveguide and light directing structure. The light directing structure includes an array of light directing features configured as generally lenticular prisms that extend in a direction substantially perpendicular (i.e., not parallel) to the average direction at which light rays enter and propagate through the waveguide. Each light directing feature defines an included angle that controls the distribution of light output from the illumination system in a first direction. The interface when provided, controls the distribution of light output from the illumination system in a second direction that is generally orthogonal with respect to the first direction.

In a first embodiment, the present invention provides an illumination system for distributing light rays from a light source comprising a solid waveguide for propagating light rays from the light source. The solid waveguide has a light output side through which light rays emerge and a light directing structure unitarily formed with the waveguide and located on a side thereof opposite to the light output side. The light directing structure includes a light directing feature array defined thereon and comprising a plurality of generally lenticular prisms oriented substantially not parallel to the direction at which light rays enter and propagate through the solid waveguide. Each of the prisms has a first and a second light directing surface disposed with respect to each other so as to define an included angle therebetween. The included angle defines an output cut-off angle of greater than approximately ±25° for controlling the light output from said illumination system.

In a second embodiment, the present invention provides an illumination system for distributing light rays from a light source comprising a solid waveguide for propagating light rays from the light source. The waveguide has a light output side through which light rays emerge and a first refractive index that is greater than 1. A light directing structure is located on a side of the waveguide opposite to the light output side and has a light directing feature array defined thereon comprising a plurality of generally lenticular prisms oriented substantially not parallel to the average direction at which light rays enter and propagate through the solid waveguide. Each of the prisms has a first and a second light directing surface disposed with respect to each other so as to define an included angle therebetween. The included angle defines an output cut-off angle of greater than approximately ±25° for controlling the light output from the illumination system in a first direction. The illumination system of this embodiment also includes an interface for coupling the light directing structure with approximately 100% contact to the solid waveguide and having a second refractive index that is less than the first refractive index of the solid waveguide. The interface controls the light output distribution from the illumination system in a second direction that is generally orthogonal with respect to the first direction.

Advantageously, the present illumination system provides an illumination system with a controllable output light distribution and an ideal light output intensity that is especially well-suited for home and office applications.

BRIEF DESCRIPTION OF THE DRAWINGS

The invention will be more fully understood and further advantages will become apparent when reference is made to the following detailed description of the preferred embodiments of the invention and the accompanying drawings in which like reference characters denote similar elements throughout the several views and wherein:

FIG. 1 is a side view of a first embodiment of an illumination system having a solid waveguide and a light directing structure unitarily formed therewith and located opposite the waveguide's light output side, and constructed in accordance with the present invention;

FIG. 2 is a side view of a second embodiment of an illumination system having a solid waveguide and a light directing structure located opposite the waveguide's light output side and coupled thereto by an interface, and constructed in accordance with the present invention;

DESCRIPTION OF THE PREFERRED EMBODIMENTS

Figure 3A:
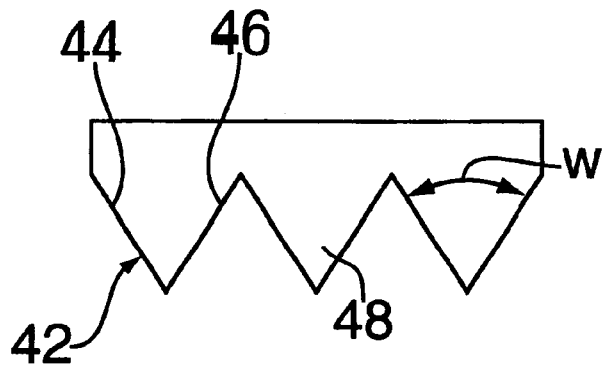
FIGS. 3a–3d are side views of various embodiments of a light directing feature in accordance with the present invention.
Figure 3B:
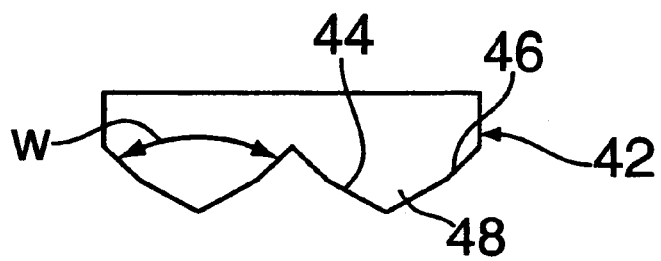
Figure 3C:
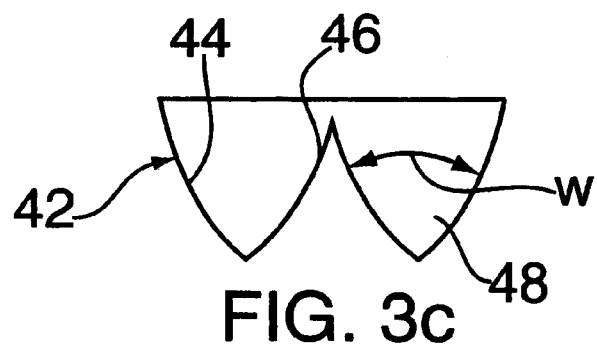
Figure 3D:
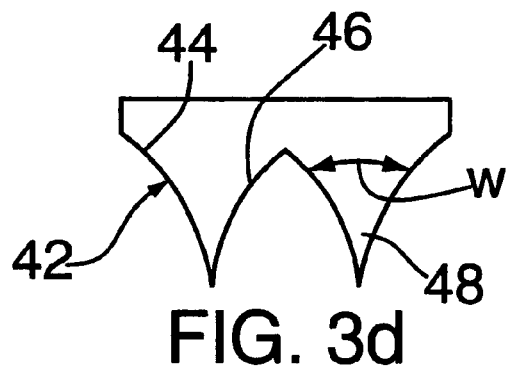

The present invention provides an illumination system having a controllable light output distribution and an intensity from an unrestricted light input source (i.e., un-collimated or full-hemisphere) and that is especially well-suited for home and office lighting applications. The illumination system generally includes a solid waveguide and an array of light directing features for controlling the light output from the illumination system in a single or first direction. An interface may be provided to optically and physically connect the waveguide and light directing features and to control the light output from the illumination system in a second direction that is generally orthogonal with respect to the first direction.

Referring to the drawings, in FIG. 1 there is shown a first embodiment of an illumination system 10 that provides a controllable light output distribution from an unrestricted light input source. For home and office lighting applications, it is desirable to have a cut-off for light output from the illumination system 10 such that there is little or no light emitted from the illumination system at angles greater than a predetermined cut-off angle C; preferably the cut-off angle is greater than approximately ±25 and less than approximately ±90°. Having a cut-off angle prevents the illumination systems from flooding an area with high angle light. It is also desirable to provide a light output having a generally uniform intensity without light "hot-spots" or concentrated points of light and that decreases or dips when the illumination system is viewed straight on, i.e. at a viewing angle of approximately 0°. Such an output distribution is referred to as a "bat-wing" pattern and is provided by the present invention.

The distribution of light output from the illumination system 10 defines an angular viewing range that is limited by the cut-off angle C, beyond which little or no light is visually detectable as emerging therefrom. By way of non-limiting example, the following detailed description will be directed to an illumination system 10 having a cut-off angle of approximately ±60°. It will be obvious to persons skilled in the art that this cut-off angular range is an illustrative and non-limiting example of the present invention and that greater or lesser cut-off angles (i.e., angular viewing ranges) are contemplated by the present invention, e.g., ranging from approximately ±25° to approximately ±90°.

The illumination system 10 generally includes a solid waveguide 30 which is optically coupled to a light source 20 that extends longitudinally along a light input side 26 of the waveguide 30. Light rays 22 from the light source 20 propagate within and through the waveguide 30 and emerge therefrom through a light output side 34 having a substantially planar light output surface 32. A reflector 24 is provided about the light source 20 to direct light rays into the waveguide 30. The waveguide 30 is constructed of a clear plastic and has a first refractive index n1 that is preferably greater than 1. In a preferred embodiment, the waveguide 30 is constructed of acrylic or polycarbonate, and has a first refractive index n1 of approximately 1.49 and 1.59, respectively. While the preferred material for the waveguide 30 is acrylic, other clear plastic materials are contemplated by the present invention, including but not limited to clear polystyrene, silicone, polyester, and nylon.

The present invention controls the emergence of light rays 22 from the waveguide 30 in a first or single direction for the embodiment of FIG. 1 and in two directions (i.e., first and second directions) for the embodiment of FIG. 2. As used herein, control of light output from the illumination system 10 in the first direction refers to a direction that is generally perpendicular to the longitudinal direction of the light directing feature array 42. Control of light output in two directions refers to a first direction that is generally perpendicular to the longitudinal direction of the light directing feature array 42, and a second direction that is generally orthogonal with respect to the first direction.

Figure 4A:
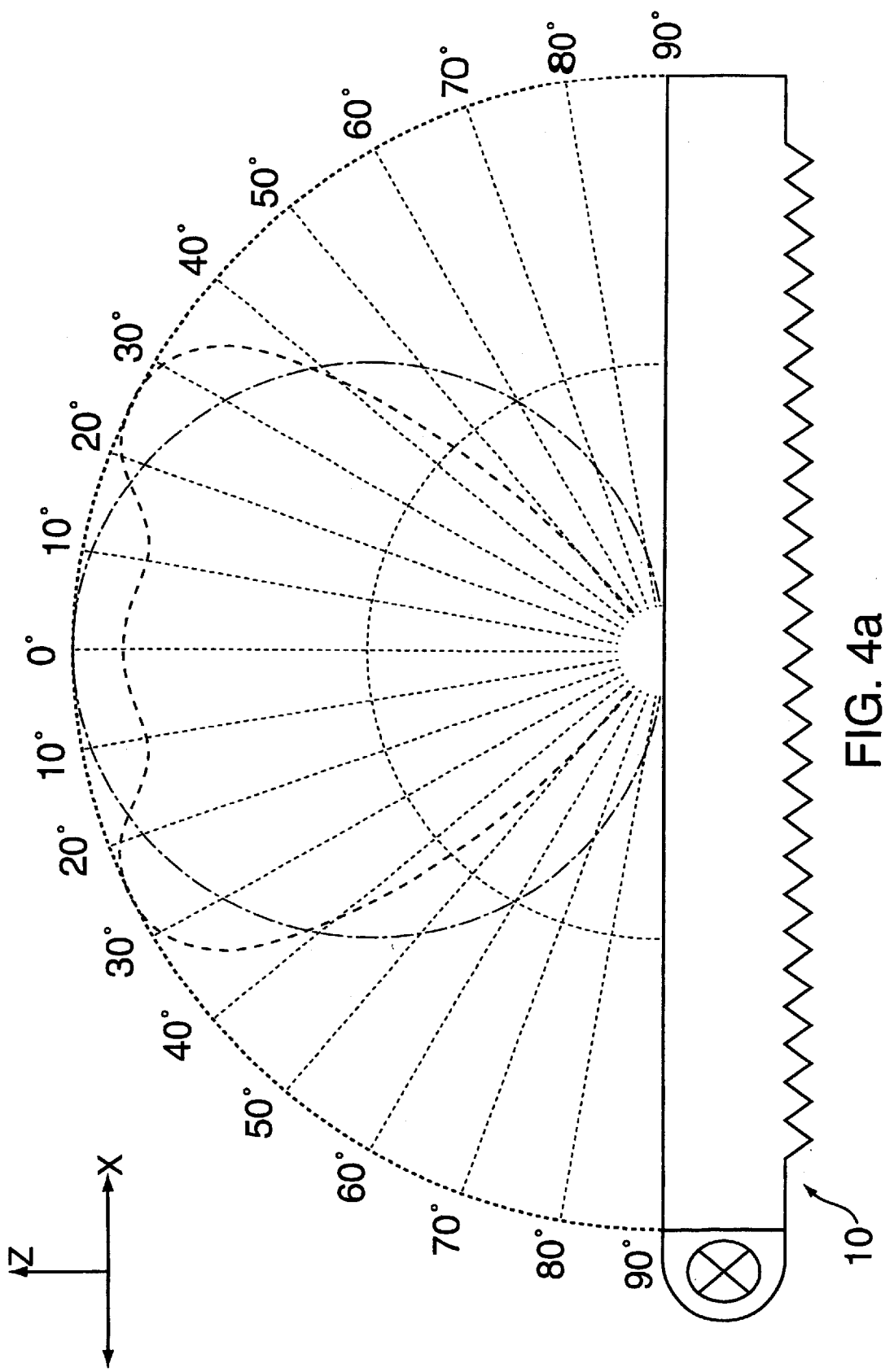
FIGS. 4a–4b are graphical representations of the light output from an illumination system constructed in accordance with the present invention.
Figure 4B:
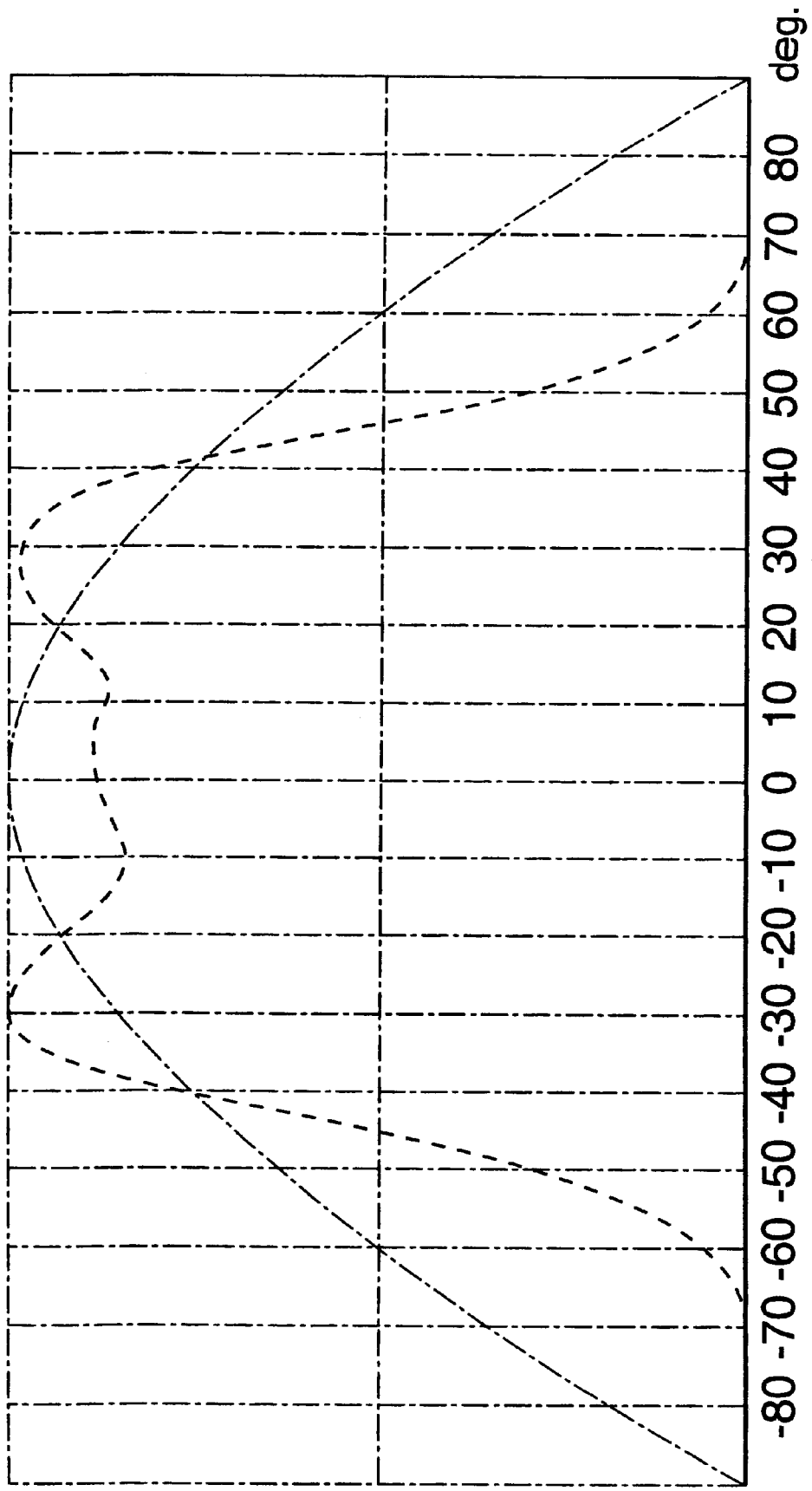

In a preferred embodiment, the light output distribution has a generally "bat-wing" shape (see, e.g. FIG. 4a) and is of substantially uniform intensity within the defined output angular viewing range. As the viewing angle moves away from 0° in either direction (i.e. positive or negative), the intensity of the light output from the illumination system 10 remains substantially constant when viewed along a plane generally perpendicular to the light input side 26 of the waveguide 30, and gradually decreases as the viewing angle along that plane approaches the cut-off angle C. This is illustrated graphically in FIGS. 4a and 4b where the cut-off angle equals approximately ±60°. By changing the included angle of the prisms 48 of the light directing feature array 42 and/or by changing the interface 60 (for the embodiment of FIG. 2), the light output distribution of the illumination system 10 of the present invention can be controlled in the first and second directions. The present invention also advantageously provides a light output that is somewhat attenuated when the viewing angle is approximately 0° (see, e.g. FIGS. 4a and 4b). This reduces the deleterious effects on the viewer's eyes when looking directing into the illumination system 10.

A light directing feature array 42 is defined on a light directing structure 40 located opposite to the light output side 34 and includes a plurality of generally lenticular prisms 48 that extend longitudinally along the waveguide 30 in a direction generally not parallel (i.e., perpendicular) to the direction at which light rays 22 enter and propagate through the waveguide 30. Each prism 48 includes first and second light directing surfaces 44, 46 that are disposed with respect to each so as to define an included angle w therebetween that controls the distribution of light output from the illumination system 10 in the first direction (i.e., in a single direction that is generally perpendicular to the longitudinal direction of the prism 48). The included angle w controls the emergence of light rays 22 from the illumination system 10 in the first direction (i.e., in the ±x-direction indicated in FIG. 4a) so that only light rays 22 having an exit angle that is less than or equal to the desired cut-off angle C emerge from the illumination system 10. In the preferred embodiment, the desired cut-off angle is approximately ±60°. The included angle w is determined by the refractive index n1 (the first refractive index) of the waveguide 30 (which is determined by the material from which the waveguide 30 is made), the angular distribution of the light input to the waveguide 30 (which need not be controlled for the present invention), and the desired angular distribution of light output from the illumination system 10, i.e., the desired cut-off angle C. For an acrylic waveguide 30 having a refractive index n1 approximately equal to 1.49, and for a light input angular distribution of full hemisphere and a desired cut-off angle of between approximately ±60°, the included angle w ranges from between about 120° and 140° depending on the specified cut-off level. It will be obvious to persons skilled in the art that other included angles will permit light rays having greater or lesser exit angles to emerge from the illumination system 10. Consequently, the present invention is not limited to the disclosed desired cut-off angular range of ±60°, but rather, includes cut-off angular ranges of between ±25° and ±90°. In addition, the light output from the illumination system 10 of the present invention may be symmetrical (e.g. ±60°), asymmetrical (e.g.+30°, −75°), or otherwise.

The included angle w for prisms 48 having substantially straight sides (see. e.g. FIG. 3a) and for a generally symmetrical cut-off angle (i.e., ±60°) is determined using the following equations:

$$90+a\sin(1/n1)-a\sin(\sin C/n1)<w<a\sin(\sin C/n1)+90 \quad (1)$$

where w is the included angle, n1 is the refractive index of the solid waveguide 30, and C is the desired cut-off angle of light output from said illumination system 10. The included angle preferably ranges from between approximately 120° and 140°, and is most preferably approximately 125°. The included angle is dependent, in part, upon the refractive index n1 of the material from which the solid waveguide 30 is fabricated. For the embodiment of FIG. 1, the light directing structure 40 is made from the same material as the waveguide 30 and has the same refractive index.

The light directing feature array 42 defines an area on the light directing structure 40 that is less than or equal to the total area of the light directing structure 40. Preferably, the area defined by the light directing feature array 42 is between approximately 5% and 100% of the total area of the light directing structure 40.

A reflective coating 52 is provided on an outer surface of the light directing feature array 42 to facilitate reflection of light rays 22 within the waveguide 30 and toward the light output side 34. Alternatively, a reflector 50 may be provided near the light directing structure 40, as shown in FIG. 2.

The number of light sources 20 provided in the illumination system 10 of the present invention depends in part on the shape of the waveguide 30 and upon the light output requirements of the illumination system 10. In addition, the light source 20 may be point-like (light bulbs), or linear (fluorescent tubes), and may also comprise, by way of non-limiting example, an array of incandescent lights, light-emitting diodes, lasers, and halogen light sources arranged in any configuration. The light source 20 is preferably located at an edge of the waveguide 30 such that light rays 22 enter the waveguide 30 at an angle that is generally perpendicular to the angle at which the light rays 22 emerge from the illumination system 10. For example, light rays 22 enter the waveguide 30 generally along the x-axis and emerge from the illumination system 10 generally along the z-axis, as shown in FIG. 1.

An alternative embodiment of the illumination system 10 of the present invention is shown in FIG. 2. The illumination system 10 includes a solid, generally rectangular waveguide 30 and a light directing structure 40 physically and optically connected thereto by an interface 60. The interface 60 may be any commercially available adhesive including fluorine polymers and acrylic polymers, and other silicone or acrylic based materials. The interface 60 provides approximately 100% physical and optical contact between the waveguide 30 and light directing structure 40. The light directing structure 40 has a third refractive index n3 that is determined by the material from which the light directing structure 40 is fabricated. In a preferred embodiment, the third refractive index n3 is greater than 1.

Figure 5:
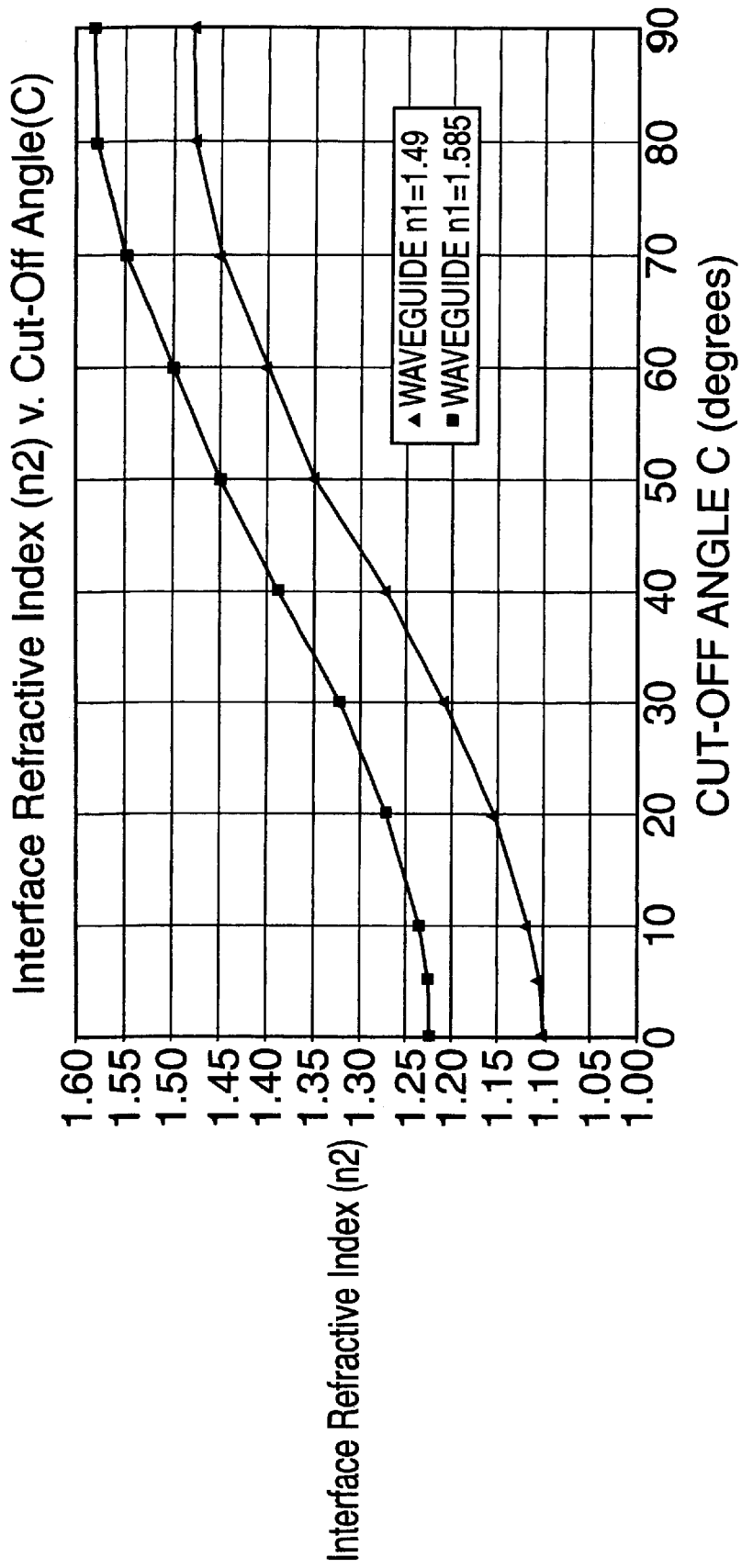
FIG. 5 is a graphical representation of the relationship between the refractive index of the interface and the cut-off angle of light output from the illumination system in accordance with the present invention.

The angular distribution of light output from the illumination system 10 is also controlled in the second direction by the refractive index n2 of the interface 60, when provided. The relationship between the refractive index n2 of the interface 60 and the cut-off angle C is defined by the equation:

$$n2 \leq (n1^2 - (\cos(C))^2)^{1/2} \tag{2}$$

where n2 is the refractive index of the interface 60, n1 is the refractive index of the waveguide 30, and C is the desired cut-off angle. This relationship is shown graphically in FIG. 5. When an interface is used to control the output cut-off angle in the second direction, calculation of the included angle for controlling the output cut-off angle in the first direction is determined by the equation:

$$180 - a\sin\left(\frac{\sqrt{n1^2 - 1}}{n3}\right) - a\sin(\sin C/n3) < \tag{3}$$

$$w < a\sin(\sin C/n3) + 180 - a\sin(n2/n3)$$

where n3 is the refractive index of the light directing structure 40.

By varying the included angle w of the prisms 48 and by selecting an interface 60 having a specific refractive index n2 the cut-off angle C in all directions can be selectively determined and the light output distribution of the illumination system 10 of the present invention selectively controlled.

Various embodiments of the prisms 48 are depicted in FIGS. 3a–3d, and triangular, multi-faceted convexly-curved, and concavely-curved cross-sectional shapes. Each prism 48 embodiment includes first and second light directing surfaces 44, 46 that disposed with respect to each other so as to define an included angle w therebetween. The prisms 48 may be located in close contacting relation to each other, as shown in FIGS. 3a–3d or there may be uniform or random gaps or spaces between prisms 48.

Having thus described the invention in rather full detail, it will be recognized that such detail need not be strictly adhered to but that various changes and modifications may suggest themselves to one skilled in the art, all falling within the scope of the invention, as defined by the subjoined claims.

What is claimed is:

1. An illumination system for distributing light rays from a light source, said illumination system comprising a solid waveguide for propagating light rays from the light source, said solid waveguide having a first refractive index that is greater than 1, said solid waveguide having a substantially planar light output side through which light rays emerge and a light directing structure which directs light from the light source to the light output side, said light directing structure being unitarily formed with said solid waveguide and located on a side of said waveguide opposite to said light output side, said light directing structure having a light directing feature array defined thereon and comprising a plurality of generally lenticular prisms oriented substantially not parallel to the average direction at which light rays enter and propagate through said solid waveguide, each of said prisms having first and second light directing surfaces disposed with respect to each other so as to define an included angle therebetween for defining an output cut-off angle of greater than approximately +/−25° for controlling the light output from said illumination system.

2. An illumination system as recited by claim 1, wherein said included angle is generally determined by the equations:

$$90 + a\sin(1/n1) - a\sin(\sin C/n1) < w < a\sin(\sin C/n1) + 90$$

where w is said included angle, n1 is said first refractive index, and C is said cut-off angle of light output from said illumination system.

3. An illumination system as recited by claim 2, wherein said included angle is between approximately 120° and 140°.

4. An illumination system as recited by claim 3, wherein said cutoff angle is approximately equal to ±60°.

5. An illumination system as recited by claim 1, wherein each said generally lenticular prism has a cross-sectional shape that is selected from a group consisting of triangular, multi-faceted and curved.

6. An illumination system as recited by claim 1, wherein said waveguide is acrylic or polycarbonate.

7. An illumination system as recited by claim 1, further comprising a reflective coating on an outer surface of said light directing feature array.

8. An illumination system as recited by claim 1, further comprising a reflector located near said light directing structure.

9. An illumination system for distributing light rays from a light source, said illumination system comprising:
- a solid waveguide for propagating light rays from the light source and having a light output side through which light rays emerge, said solid waveguide having a first refractive index that is greater than 1;
- a light directing structure which directs light from the light source to the light output side and which is located on a side of said waveguide opposite to said light output side and having a third refractive index, said light directing structure having a light directing feature array defined thereon and comprising a plurality of generally lenticular prisms oriented substantially not parallel to the average direction at which light rays enter and propagate through said solid waveguide, each of said prisms having first and second light directing surfaces disposed with respect to each other so as to define an included angle therebetween for defining an output cut-off angle of greater than approximately +/−25° for controlling the light output from said illumination system in a first direction; and
- an interface for coupling said light directing structure with approximately 100% contact to said solid waveguide and having a second refractive index that is less than said first refractive of said solid waveguide, said interface controlling the light output distribution from said illumination system in a second direction that is generally orthogonal with respect to said first direction.

10. An illumination system as recited by claim 9, wherein said second refractive index determines, at least in part, a cut-off angle for light output from said illumination system, said second refractive index being determined by the equation:

$$n2 \leq (n1^2 - (\cos(C))^2)^{1/2}$$

where n2 is said second refractive index, n1 is said first refractive index, and C is said cut-off angle of light output from said illumination system.

11. An illumination system as recited by claim 9, wherein said included angle is determined by the equations:

$$180 - \mathrm{asin}\left(\frac{\sqrt{n1^2-1}}{n3}\right) - \mathrm{asin}(\sin C/n3) <$$

$$w < \mathrm{asin}(\sin C/n3) + 180 - \mathrm{asin}(n2/n3)$$

where w is said included angle, n1 is said first refractive index, and C is said cut-off angle of light output from said illumination system, n2 is said second refractive index, and n3 is said third refractive index.

12. An illumination system as recited by claim 11, wherein said included angle is between approximately 120° and 140°.

13. An illumination system as recited by claim 9, wherein said cutoff angle is approximately equal to ±60°.

14. An illumination system as recited by claim 9, wherein said interface is fluorine polymer based, silicone based or acrylic based.

15. An illumination system as recited by claim 9, wherein each said generally lenticular prism has a cross-sectional shape that is selected from a group consisting of triangular, multi-faceted and curved.

16. An illumination system as recited by claim 9, wherein said light directing feature defines an area on said light directing structure that is at least 5% of the total area defined by said light directing structure.

17. An illumination system as recited by claim 9, wherein said waveguide is acrylic or polycarbonate.

18. An illumination system as recited by claim 9, wherein said first direction is generally perpendicular to said light directing feature array.

19. An illumination system as recited by claim 9, further comprising a reflective coating on an outer surface of said light directing feature array.

20. An illumination system as recited by claim 9, further comprising a reflector located near said light directing structure.

21. An illumination system for distributing light rays from a light source, said illumination system comprising a solid waveguide for propagating light rays from the light source, said solid waveguide having a first refractive index that is greater than one, said solid waveguide having a light output side through which light rays emerge and a light directing structure which directs light from the light source to the light output side, said light directing structure unitarily formed with said solid waveguide and located on a side of said waveguide opposite to said light output side, said light directing structure having a light directing feature array that defines an area on said light directing structure that is at least approximately 5% of the total area defined by said light directing structure, said light directing feature comprising a plurality of generally lenticular prisms oriented substantially not parallel to the average direction at which light rays enter and propagate through said solid waveguide, each of said prisms having first and second light directing surfaces disposed with respect to each other so as to define an included angle therebetween for defining an output cut-off angle of greater than approximately ±25° for controlling the light output from said illumination system.

* * * * *